No. 749,887. PATENTED JAN. 19, 1904.
H. THIEDEMANN.
SLEIGH RUNNER ATTACHMENT FOR VEHICLES.
APPLICATION FILED AUG. 10, 1903.
NO MODEL.
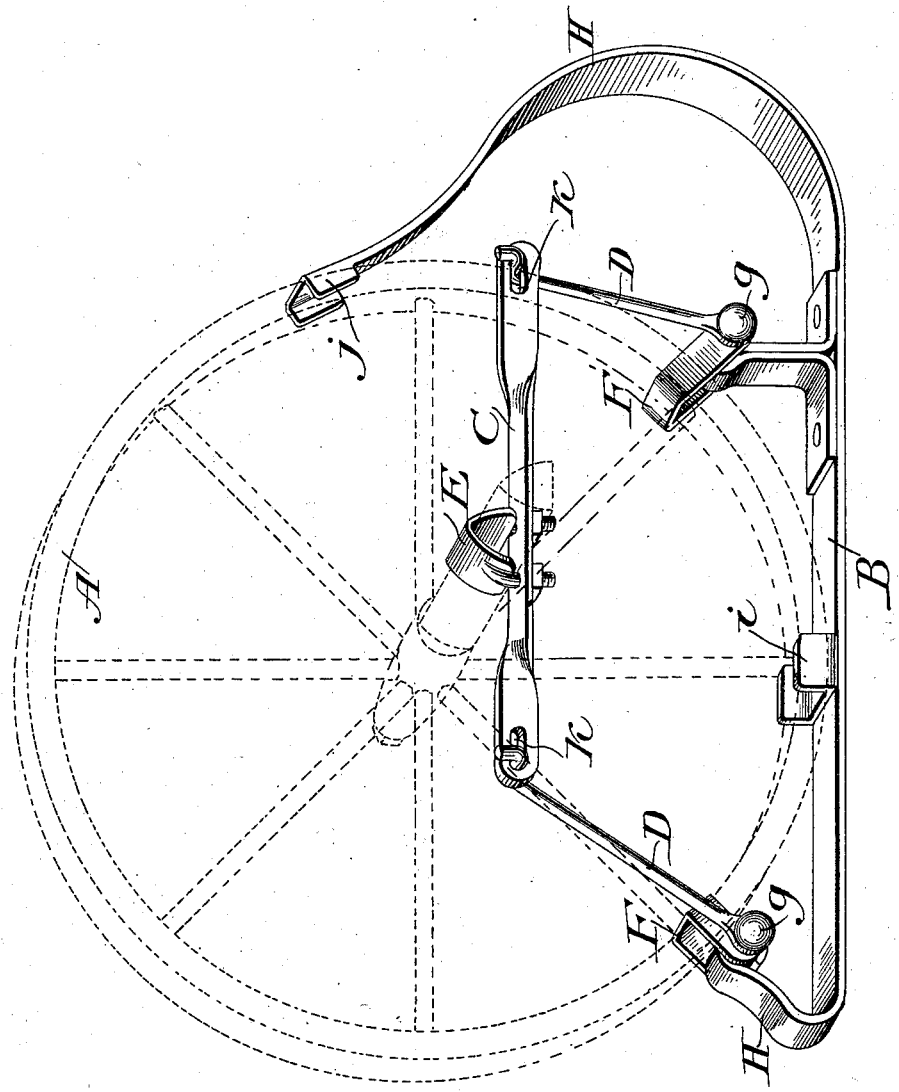
Witnesses:
Henry Diesel
J. T. de Haan
Inventor:
Henry Thiedemann No. 749,887. Patented January 19, 1904.

UNITED STATES PATENT OFFICE.

HINRY THIEDEMANN, OF HICKMAN, NEBRASKA.

SLEIGH-RUNNER ATTACHMENT FOR VEHICLES.

SPECIFICATION forming part of Letters Patent No. 749,887, dated January 19, 1904.

Application filed August 10, 1903. Serial No. 169,056. (No model.)

*To all whom it may concern:*

Be it known that I, HINRY THIEDEMANN, a citizen of the United States, residing at Hickman, in the county of Lancaster and State of Nebraska, have invented new and useful Improvements in Sleigh-Runner Attachments, of which the following is a specification.

My invention relates to a sleigh-runner attachment for wheeled vehicles, and has for its object a construction whereby the wheel will be rigidly supported on the runner.

A further object is to provide a runner which can be readily secured to or removed from the wheel.

With these objects in view the invention consists in certain novel features of construction hereinafter described and claimed, and shown in the accompanying drawing, in which a perspective view of the invention is given.

Referring specifically to the drawing, A indicates the vertical vehicle-wheel, and B the runner, on which the wheel sets between projecting flanges $i$ thereon. The runner is curved upwardly in front, as at H, and has at its end projecting flanges $j$, which embrace the rim above the center of the wheel. The rear end of the runner is bent upwardly toward the wheel, as at H', and at the end of said extension an eye is formed through which a bolt $g$ passes, having pivoted thereon a clamp F, which extends around the rim of the wheel. This clamp is located behind the flanges $i$, and in front thereof a similar clamp F' also extends around the rim. The clamp F' is pivoted by a bolt $g'$ to a standard bolted to the runner, the standard being formed with an eye through which the bolt passes. The line of draft in wheeled vehicles being from the axle and the center of the wheel, the runner has a tendency to work loose from the wheel unless the line of draft is transferred to the runner itself. To accomplish this, I employ a horizontal bar C, which is bolted to the under side of the axle by a clip E. Slots K are formed in the outer end of the bar. At D are indicated brace-rods, the upper ends of which are formed into a hook which extends into the slots K. The lower ends of the rods are secured to the pivot-bolts $g$ and $g'$, respectively. By this construction the line of draft is transferred to the runner and the wheel will be rigidly supported thereon. By locating the flanges $j$ above the center of the wheel the stability of the structure is further increased. The runner is readily removed from the wheel, it being necessary only to remove the clip on the axle and the pivot-bolts $g$ and $g'$.

Having thus described my invention, what is claimed as new, and desired to be secured by Letters Patent, is—

1. The combination with a vehicle wheel and axle, of a sleigh-runner attachment secured to the wheel, a horizontally-disposed bar secured to the axle and extending in the front and rear thereof, and brace-rods extending from each end of the bar to the runner.

2. The combination with a vehicle wheel and axle, of a sleigh-runner attachment secured to the wheel, a horizontally-disposed bar having slotted ends, secured to the axle and extending outwardly on both sides thereof, and brace-rods pivoted to the runner and extending into the slots.

In testimony whereof I have signed my name to this specification in the presence of two subscribing witnesses.

HINRY THIEDEMANN.

Witnesses:
   J. T. DE HAAN,
   J. H. THIEDEMANN.